US009632507B1

(12) United States Patent
Korn

(10) Patent No.: US 9,632,507 B1
(45) Date of Patent: Apr. 25, 2017

(54) SYSTEM AND METHOD FOR ADJUSTING VEHICLE PLATOON DISTANCES BASED ON PREDICTED EXTERNAL PERTURBATIONS

(71) Applicant: Meritor WABCO Vehicle Control Systems, Troy, MI (US)

(72) Inventor: Alan Korn, Rochester Hills, MI (US)

(73) Assignee: MERITOR WABCO VEHICLE CONTROL SYSTEMS, Troy, MI (US)

( * ) Notice: Subject to any disclaimer, the term of this patent is extended or adjusted under 35 U.S.C. 154(b) by 0 days.

(21) Appl. No.: 15/010,512

(22) Filed: Jan. 29, 2016

(51) Int. Cl.
| G05D 1/00 | (2006.01) |
| G05D 1/02 | (2006.01) |
| G08G 1/16 | (2006.01) |
| B60T 7/12 | (2006.01) |

(52) U.S. Cl.
CPC .............. *G05D 1/0295* (2013.01); *B60T 7/12* (2013.01); *G05D 1/0027* (2013.01); *G08G 1/163* (2013.01); *G05D 1/0291* (2013.01); *G05D 1/0293* (2013.01)

(58) Field of Classification Search
CPC ...... G05D 1/0295; G05D 1/0027; B60T 7/12; G08G 1/163
USPC ................................................ 701/2, 23–36
See application file for complete search history.

(56) References Cited

U.S. PATENT DOCUMENTS

| 5,680,122 | A | | 10/1997 | Mio |
| 5,777,451 | A | * | 7/1998 | Kobayashi ............. G08G 1/166 |
| | | | | 180/169 |
| 5,781,119 | A | | 7/1998 | Yamashita et al. |
| 5,815,825 | A | | 9/1998 | Tachibana et al. |
| 6,128,559 | A | | 10/2000 | Saitou et al. |
| 6,285,929 | B1 | | 9/2001 | Hashimoto |
| 6,397,149 | B1 | | 5/2002 | Hashimoto |

(Continued)

FOREIGN PATENT DOCUMENTS

| DE | 10109052 A1 | 9/2002 |
| DE | 102004017603 A1 | 10/2005 |

(Continued)

*Primary Examiner* — Tyler J Lee
(74) *Attorney, Agent, or Firm* — Patterson Intellectual Property Law, PC; Edward D. Lanquist; Gary L. Montle

(57) ABSTRACT

A control system is provided for platooning a plurality of vehicles, each of which equipped with vehicle braking control systems and V2V communication system components. The system determines nominal following distances for each of said following vehicles relative to an immediately preceding vehicle, based in part on brake performance capabilities. Vehicle sensors throughout the platoon are implemented to monitor target vehicles positioned relative to the platoon, and some or all of the nominal following distances are dynamically adjusted to account for braking event risks associated with the target vehicles. Adjustment to following distances for trailing vehicles may be proactively applied even before braking reaction is determined or applied for a lead vehicle, and control signals are simultaneously generated implementing vehicle movement adjustments based on the following distance adjustments. Adjustments may be based on threshold violations associated with target vehicles in front, laterally merging into, or tailgating behind the platoon.

20 Claims, 7 Drawing Sheets

(56) References Cited

U.S. PATENT DOCUMENTS

| | | | |
|---|---|---|---|
| 7,554,435 B2* | 6/2009 | Tengler | B60Q 1/44 |
| | | | 340/425.5 |
| 8,352,112 B2 | 1/2013 | Mudalige | |
| 8,442,735 B2 | 5/2013 | Hrovat et al. | |
| 8,666,587 B2 | 3/2014 | Anderson | |
| 8,744,666 B2* | 6/2014 | Switkes | G08G 1/166 |
| | | | 280/292 |
| 8,948,995 B2 | 2/2015 | Pandita et al. | |
| 2002/0198632 A1 | 12/2002 | Breed et al. | |
| 2004/0193372 A1 | 9/2004 | MacNeille et al. | |
| 2005/0107945 A1 | 5/2005 | Hiller et al. | |
| 2006/0095195 A1* | 5/2006 | Nishimura | B60W 30/025 |
| | | | 701/96 |
| 2006/0293841 A1 | 12/2006 | Hrovat et al. | |
| 2007/0043502 A1 | 2/2007 | Mudalige et al. | |
| 2007/0197230 A1 | 8/2007 | Roggero et al. | |
| 2008/0059007 A1* | 3/2008 | Whittaker | G05D 1/027 |
| | | | 701/2 |
| 2009/0228157 A1 | 9/2009 | Breed | |
| 2009/0287412 A1 | 11/2009 | Menzel et al. | |
| 2010/0045482 A1 | 2/2010 | Strauss | |
| 2010/0094509 A1 | 4/2010 | Lüke et al. | |
| 2010/0202346 A1 | 8/2010 | Sitzes et al. | |
| 2010/0256835 A1 | 10/2010 | Mudalige | |
| 2010/0256852 A1* | 10/2010 | Mudalige | G08G 1/163 |
| | | | 701/24 |
| 2011/0118967 A1 | 5/2011 | Tsuda | |
| 2011/0122244 A1 | 5/2011 | Cho | |
| 2011/0208399 A1 | 8/2011 | Fekete et al. | |
| 2011/0270514 A1 | 11/2011 | Shida | |
| 2012/0252415 A1 | 10/2012 | Menzel et al. | |
| 2013/0015984 A1* | 1/2013 | Yamashiro | G08G 1/22 |
| | | | 340/988 |
| 2013/0030606 A1 | 1/2013 | Mudalige et al. | |
| 2013/0041567 A1 | 2/2013 | Yamashiro | |
| 2013/0041576 A1* | 2/2013 | Switkes | G08G 1/166 |
| | | | 701/123 |
| 2013/0054127 A1 | 2/2013 | Yamashiro | |
| 2013/0079953 A1 | 3/2013 | Kumabe | |
| 2013/0080040 A1 | 3/2013 | Kumabe | |
| 2013/0080041 A1 | 3/2013 | Kumabe | |
| 2013/0116861 A1 | 5/2013 | Nemoto | |
| 2013/0124064 A1 | 5/2013 | Nemoto | |
| 2013/0218365 A1 | 8/2013 | Caveney et al. | |
| 2013/0231820 A1* | 9/2013 | Solyom | G05D 1/0293 |
| | | | 701/23 |
| 2013/0317676 A1* | 11/2013 | Cooper | B61L 3/121 |
| | | | 701/20 |
| 2013/0325306 A1 | 12/2013 | Caveney et al. | |
| 2014/0005906 A1 | 1/2014 | Pandita et al. | |
| 2014/0019031 A1 | 1/2014 | Solyom et al. | |
| 2014/0100734 A1 | 4/2014 | Yamashiro | |
| 2014/0107867 A1 | 4/2014 | Yamashiro | |
| 2014/0140353 A1 | 5/2014 | Stählin et al. | |
| 2014/0172265 A1 | 6/2014 | Funabashi | |
| 2014/0236449 A1 | 8/2014 | Horn | |
| 2014/0316671 A1 | 10/2014 | Okamoto | |
| 2014/0316865 A1 | 10/2014 | Okamoto | |
| 2014/0327775 A1 | 11/2014 | Cho | |
| 2015/0012204 A1 | 1/2015 | Breuer et al. | |
| 2015/0356635 A1* | 12/2015 | Thurston | B60Q 9/00 |
| | | | 705/306 |

FOREIGN PATENT DOCUMENTS

| | | |
|---|---|---|
| DE | 102004017604 A1 | 10/2005 |
| DE | 102004056724 A1 | 5/2006 |
| DE | 102010046236 A1 | 5/2011 |
| DE | 1012012022035 A1 | 5/2013 |
| EP | 0816168 A2 | 1/1998 |
| EP | 1296305 A1 | 3/2003 |
| EP | 1504948 A2 | 2/2005 |
| EP | 1975901 A1 | 10/2008 |
| EP | 0357963 A2 | 5/2011 |
| EP | 2555583 A2 | 2/2013 |
| EP | 2827316 A1 | 1/2015 |
| JP | 2007261448 A | 10/2007 |
| WO | 2008113836 A1 | 9/2008 |
| WO | 2008128998 A1 | 10/2008 |
| WO | 2009024563 A1 | 2/2009 |
| WO | 2009027244 A1 | 3/2009 |
| WO | 2009043643 A1 | 4/2009 |
| WO | 2012105889 A1 | 8/2012 |
| WO | 2013165297 A1 | 11/2013 |
| WO | 2013171089 A1 | 11/2013 |
| WO | 2013187834 A1 | 12/2013 |
| WO | 2013187839 A1 | 12/2013 |
| WO | 2014003630 A1 | 1/2014 |
| WO | 2014029492 A1 | 2/2014 |
| WO | 2014137270 A1 | 9/2014 |
| WO | 2014145918 A1 | 9/2014 |

* cited by examiner

SYSTEM AND METHOD FOR ADJUSTING VEHICLE PLATOON DISTANCES BASED ON PREDICTED EXTERNAL PERTURBATIONS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to vehicle platooning. More particularly, the present invention relates to systems and methods for dynamically adjusting platoon characteristics such as respective following distances for a number of vehicles such as tractor trailers based on predicted external effects or perturbations.

The benefits of driver assistive vehicle platooning are well-established, as are the heightened benefits of a reduced following distance between respective vehicles in a platoon orientation. For example, minimizing following distances can result in reduced aerodynamic drag for all vehicles in a platoon, and thereby improve respective fuel economies. At highway speeds, aerodynamic drag may be characterized as the greatest consumer of vehicle power, well in excess of the combined effects of rolling friction resistance and vehicle accessory losses. Test results have indicated that vehicles consistently achieve increased benefits correlating to closer following distances, although the energy-saving benefits may vary depending on the respective vehicle position within a platoon.

Advanced braking control systems have been implemented, along with integrated vehicle-to-vehicle communications, for the purpose of facilitating vehicle platooning and reducing the associated following distances to the extent possible. However, conventional techniques are unable to safely reduce the following distances between vehicles to a desired level, at least because of the inherent external perturbations which arise during typical traffic flow. A trailing vehicle in a platoon must implement a following distance which accounts for the successive detection of braking actions by a preceding vehicle, and the accompanying reactions by intervening vehicles. Conventional techniques, as one of skill in the art today may recognize, therefore rely on reaction to an actual braking event by a preceding vehicle within the platoon with respect to a particular trailing vehicle, or an anticipatory reaction by a driver of the trailing vehicle based upon visual investigation of the traffic and road conditions.

It would be desirable to provide and implement a platoon control system which identifies potential external perturbations to the platoon and dynamically accounts for the risk of predicted braking events, even prior to any actual braking or other reaction by another vehicle in the platoon.

It would further be preferable for such a platoon control system to cause trailing vehicles within or otherwise as part of the platoon to dynamically adjust their respective following distances in view of such predicted braking events by vehicles that are not within or otherwise part of the platoon, again without waiting for or otherwise having to detect a reaction by preceding vehicles in the platoon.

BRIEF SUMMARY OF THE INVENTION

In accordance with various embodiments of a vehicle platooning control system and associated methods as described herein, a plurality of vehicles defining a platoon are configured to dynamically and automatically adjust a nominal following distance based on actual or projected perturbations to the platoon as a whole. Otherwise stated, a collective platoon unit may be defined having communications network devices, sensors, cameras and the like so as to monitor traffic, road and ambient conditions, wherein any one vehicle in the platoon unit is configured to adjust its following distance with respect to a preceding vehicle based on a braking or other form of event risk. A vehicle platooning control system as disclosed herein may therefore appropriately balance the desire to maintain a minimum effective following distance between each respective vehicle pair in the platoon, while making real-time adjustments to any one or more of said following distances with respect to potential braking events that are otherwise undetectable from the aforementioned prior art techniques.

In one aspect of various embodiments as described herein, each vehicle in a potential platoon combination may be respectively equipped with one or more vehicle braking control and platoon implementation systems and one or more sensors collectively configured to monitor at least a following distance between the vehicle and the other one or more vehicles, a relative deceleration value for the vehicle, and a pressure value with respect to a braking actuator for the vehicle.

In another aspect, a lead vehicle in a defined platoon may monitor relative position, velocity, acceleration/deceleration and the like for at least a target vehicle located directly in front of the lead vehicle and hence the platoon as a whole, wherein a braking event risk may be determined. The lead vehicle may further independently identify or otherwise provide signals whereby a back-end server may programmatically identify a type of target vehicle, wherein a braking event risk may be determined further based on a relative braking ability or likelihood of the same with respect to the target vehicle. For example, it may be appreciated that a sedan may typically have a relatively greater braking ability than a heavy truck otherwise similarly situated as a target vehicle.

In another aspect, a rear vehicle in a defined platoon may monitor relative position, velocity, acceleration/deceleration and the like for at least a target vehicle located directly behind the rear vehicle and hence the platoon as a whole, wherein an event risk associated with, e.g., potential tailgating may be determined. The rear vehicle may further independently identify or otherwise provide signals whereby a back-end server may programmatically identify a type of the target vehicle, wherein an event risk may be determined further based on inherent characteristics of the target vehicle.

In another aspect, each vehicle in a defined platoon may monitor relative position, velocity, acceleration/deceleration and the like for one or more target vehicles located to either side of the platoon as a whole, wherein a braking event risk associated with, e.g., interjection by a target vehicle among the platoon or otherwise cutting in front of the lead vehicle, etc., may be determined. A likelihood of braking event risk may further be determined further based on inherent characteristics of the respective target vehicles. In this manner, for example, a trailing vehicle within the platoon may identify and monitor one or more target vehicles approaching the platoon from either side, and determine a braking event risk for the lead vehicle in a manner that is otherwise unavailable to the lead vehicle in the case wherein the respective target vehicles are in a "blind spot" for the lead vehicle itself.

DETAILED DESCRIPTION OF THE INVENTION

Figure 1:
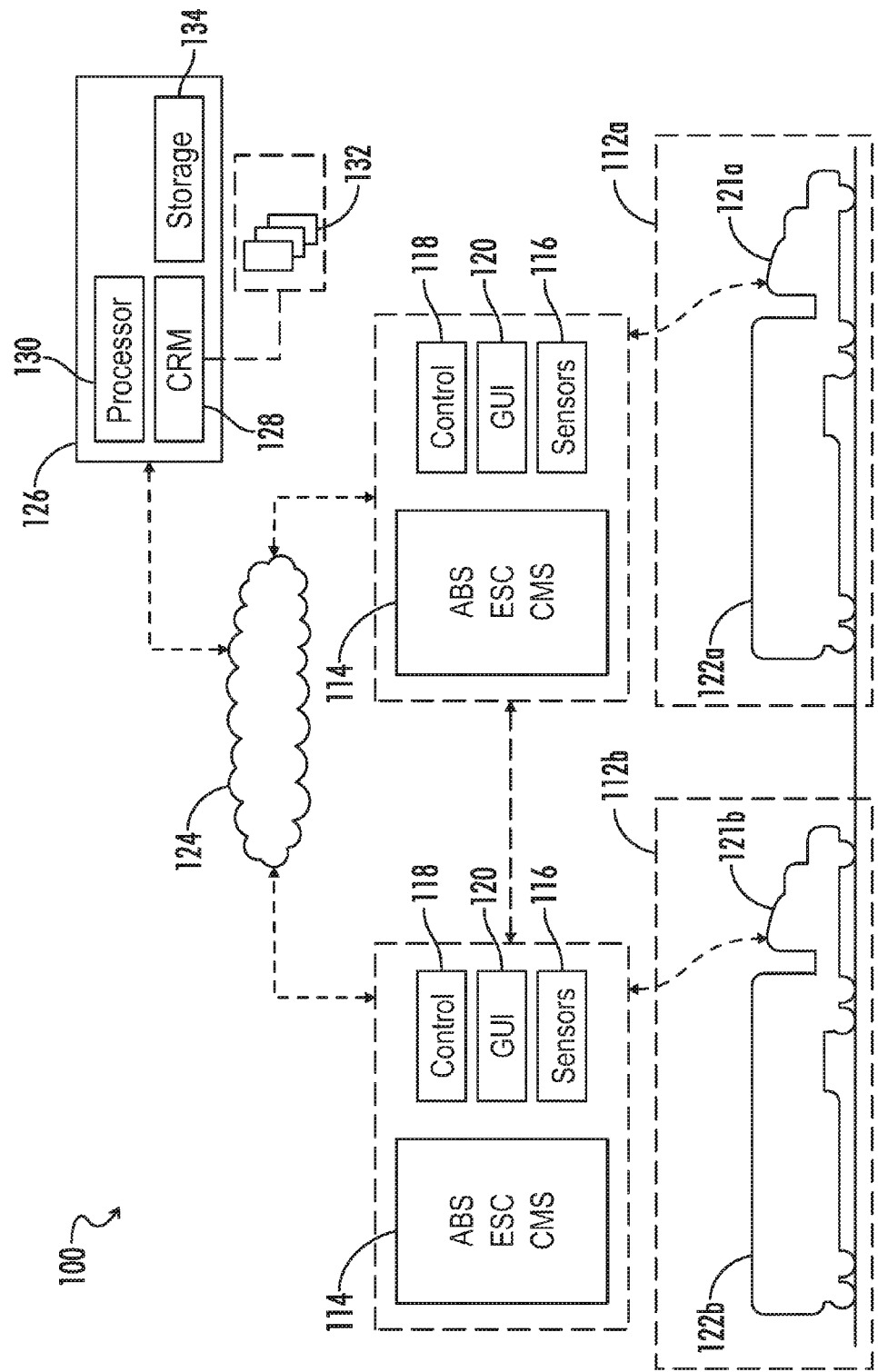
FIG. 1 is a block diagram representing an embodiment of a vehicle platoon control system as disclosed herein.
Figure 2A:
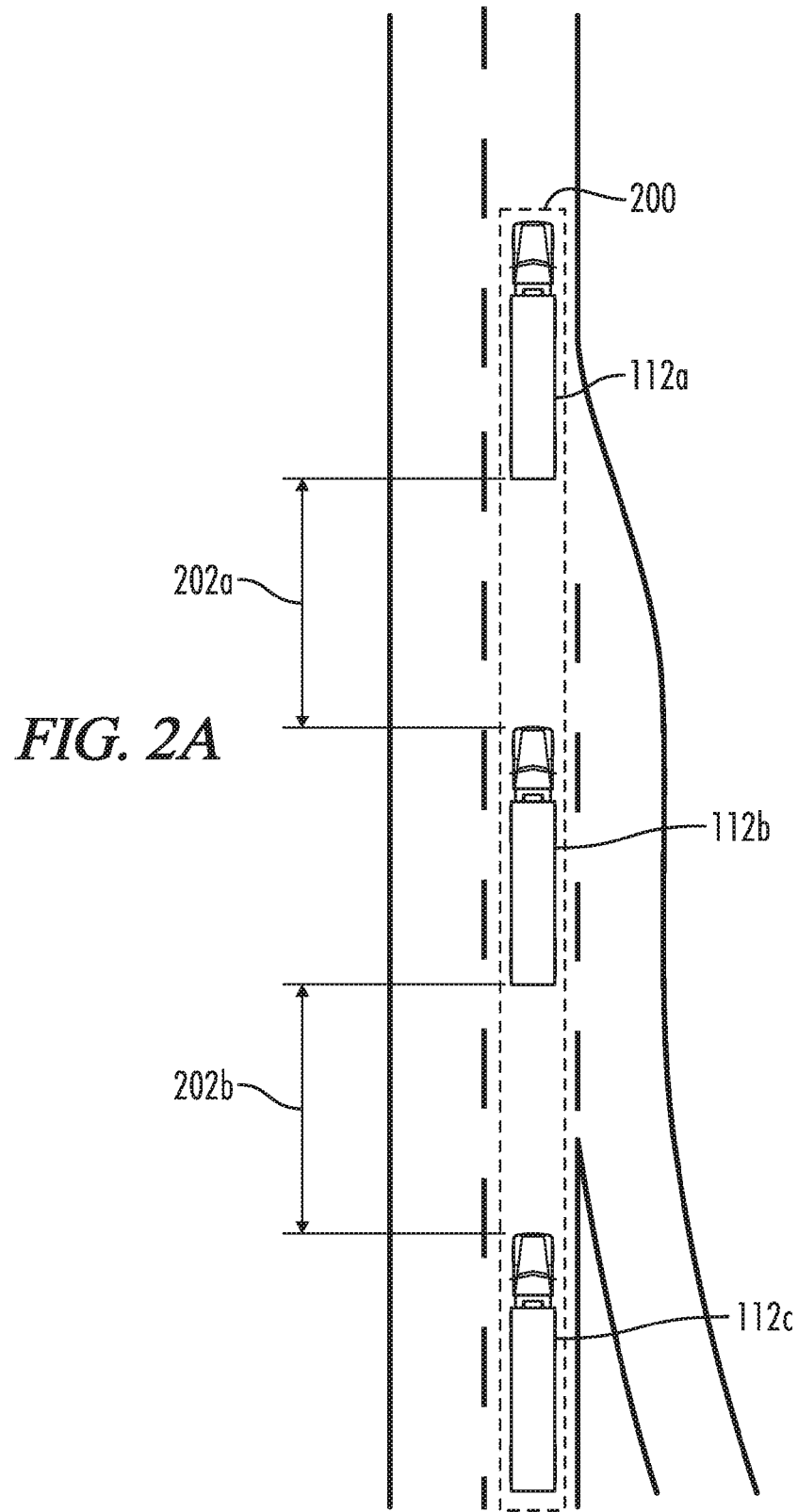
FIGS. 2A-2E are diagrams representing an exemplary vehicle platoon and various traffic orientations further representing potential external perturbations according to the present disclosure.
Figure 2B:
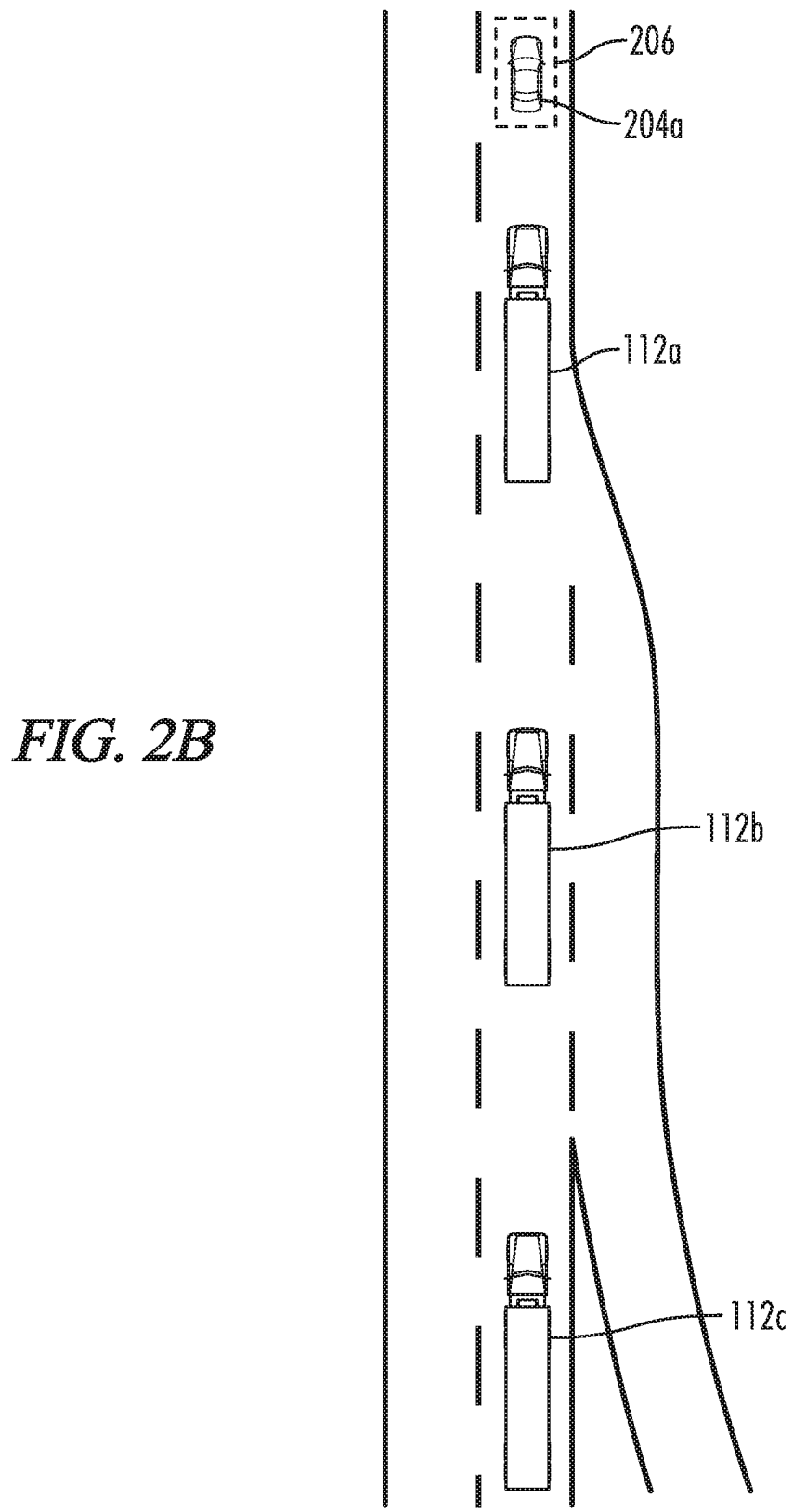
Figure 2C:
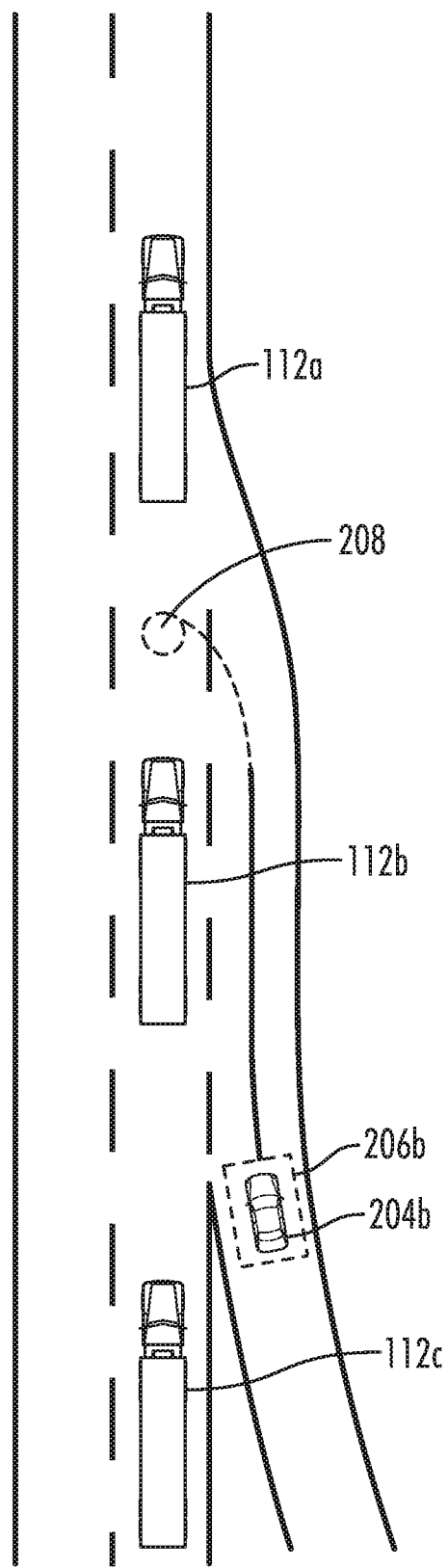
Figure 2D:
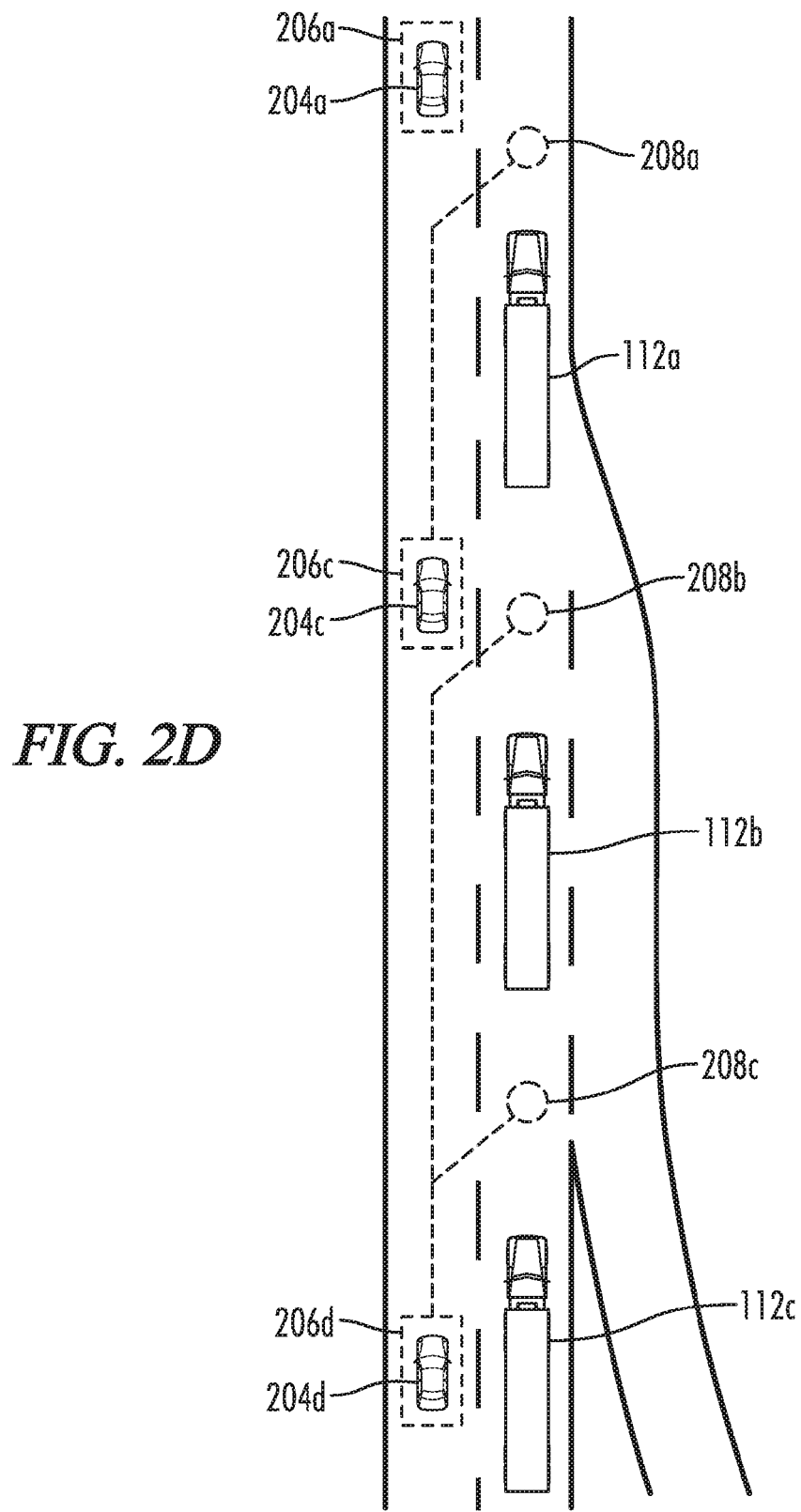
Figure 2E:
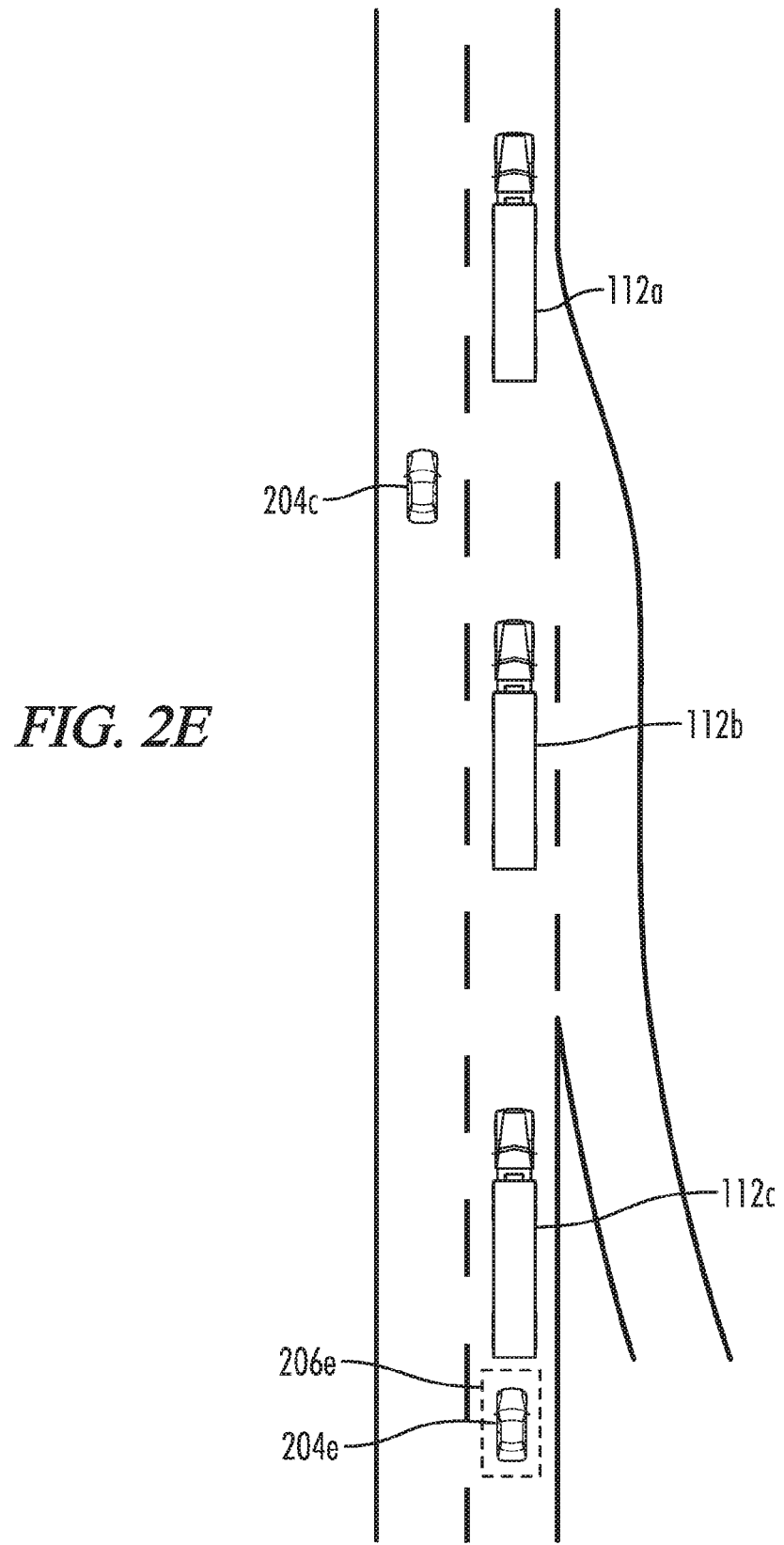
Figure 3:
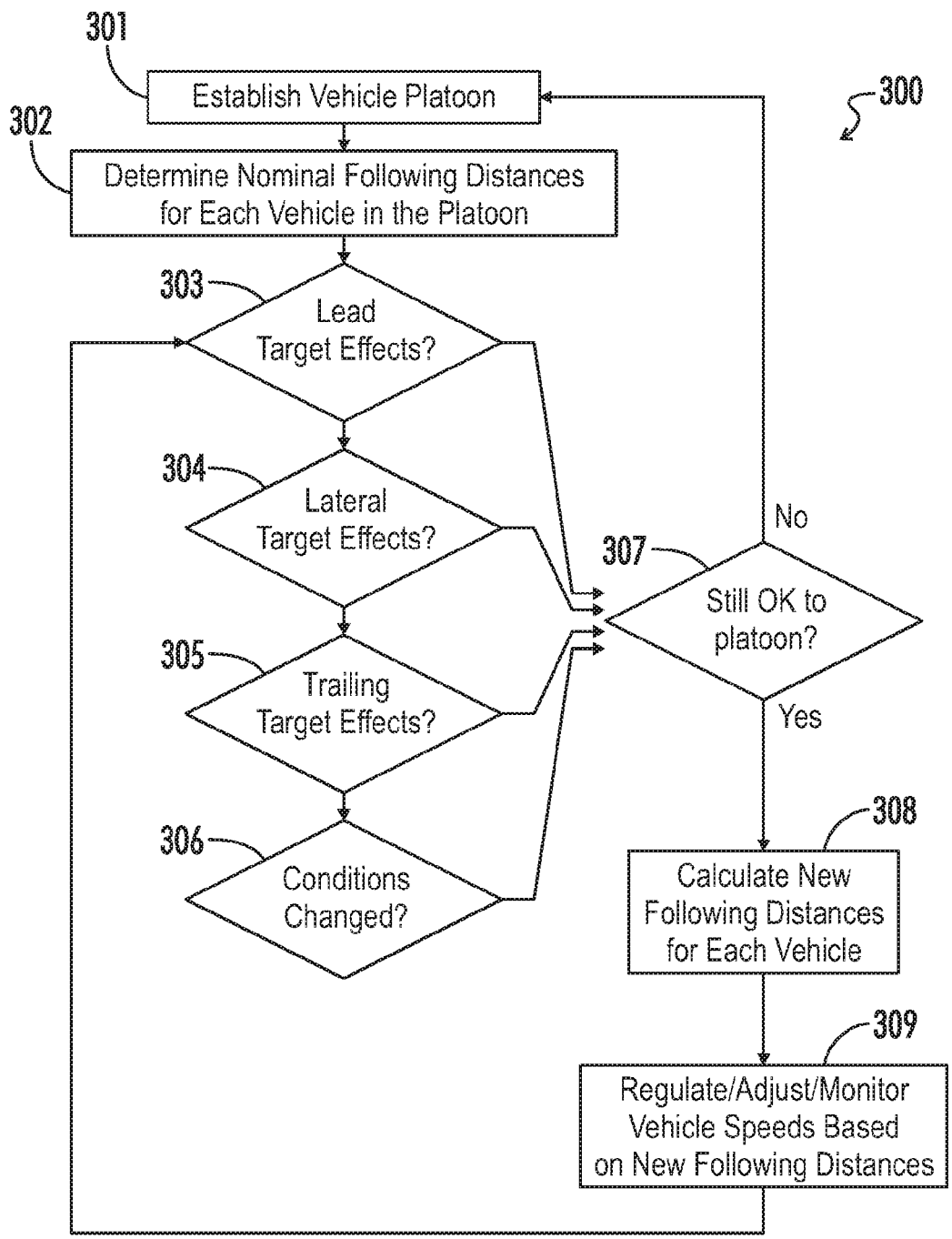
FIG. 3 is a flowchart representing an embodiment of a process for controlling vehicles in a platoon according to the present disclosure.

Referring generally to FIGS. 1-3, various exemplary embodiments of a vehicle platooning control system and method may now be described in detail. Where the various figures may describe embodiments sharing various common elements and features with other embodiments, similar elements and features are given the same reference numerals and redundant description thereof may be omitted below.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Referring first to FIG. 1, a vehicle platooning control system 100 as disclosed herein may be provided with respect to at least a first vehicle 112a and a second vehicle 112b. In certain embodiments, the vehicle platooning control aspects may be implemented solely via components residing upon the vehicles themselves. In other embodiments, the vehicles may each be configured to communicate not only with each other but further via a communications network 124 with a remote computing network including for example one or more servers 126 configured to implement platooning control aspects.

Each vehicle in a potential platoon may be considered to have at least certain minimum structural components in order for various embodiments of the present disclosure to be implemented. As shown in the example embodiment of FIG. 1, the vehicles may include one or more vehicle braking control systems 114, condition sensors 116, local control circuitry/processor 118 functionally linked to the braking control systems and sensors, and a user interface 120 which typically includes graphical display components but may also include any other user input/output elements as may be necessary or desirable for conveying information to and from the driver of the respective vehicle.

In the particular embodiment as shown in FIG. 1, the vehicle braking control and platoon implementation systems 114 as necessary to provide the recited functions herein may be selected from various systems as are known to those of skill in the art including but not limited to an Anti-Lock Braking System ("ABS") for the vehicle, and to the extent that the vehicle includes a tractor and a trailer further an ABS for the respective trailer 122, Electronic Stability Control ("ESC"), Collision Mitigation Systems ("CMS"), Vehicle-to-Vehicle Communications ("V2V"), Lane Departure Warning ("LDW") and Lane Keep Assist ("LKA"), and the like. A trailer ABS may generally be considered to be configured for communication of ABS events with at least the respective tractor.

In certain embodiments, otherwise conventional braking control systems 114 such as the CMS for example may be supplemented or otherwise configured to include hardware, software, or some combination thereof so as to execute a vehicle platooning algorithm in accordance with the present disclosure. Alternatively, vehicle platooning algorithms and components may be separately associated with control block 118. In various embodiments, the braking control systems, and more particularly the CMS, may be implemented for distance measurement using techniques as are known to those of skill in the art.

The vehicle sensors 116 may be configured to provide at least certain information as needed to execute functions for a particular embodiment of the platooning control system, including for example a following distance between a given pair of vehicles, relative velocity and acceleration/deceleration values for the respective vehicle, a pressure value with respect to a braking actuator for the respective vehicle, front and rear radar/LIDAR/sensors for distance measurement, image capturing and the like, side lane monitoring devices, alternative pressure sensors integrally mounted to or associated with solenoid valves, etc.

In various embodiments, vehicles in the platoon may further be equipped with display units or other devices by which notice may be visually or audibly provided to vehicles outside of the platoon. For example, while the platooning control system may be configured to dynamically adjust internal characteristics such as respective following distances within the platoon based on a tailgater or equivalent potential perturbation, a rear vehicle may further be configured to generate a display indication and thereby warn the target vehicle that it is (potentially unsafely) encroaching upon a vehicle platoon. In an embodiment, the platooning control system may direct one or more vehicles in the platoon, including at least the trailing vehicle, to collectively accelerate or to accelerate in varying degrees for extending the respective following distances there between, based on a tailgater or equivalent potential perturbation.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Referring next to FIGS. 2A-3, an embodiment of a vehicle following distance adjustment procedure 300 may be provided as follows.

The procedure may be considered as beginning (step 301) by establishing a vehicle platoon unit comprising a plurality of vehicles 112. In the event that a platoon has already been formed, this step may be considered unnecessary, but otherwise steps may be taken to determine if a platoon is appropriate. In one embodiment, a server-based system may receive a request from one or more vehicles in a potential platoon, and subsequently collect or otherwise obtain data corresponding to pre-conditions which must be satisfied in order to establish a vehicle platoon. In a particular example, wherein each of the vehicles are already communicatively linked via V2V, the drivers may manually inform their respective systems of a desire to platoon, wherein one or more of the vehicle systems generates a request to the vehicle platooning system. As is alluded to above, this step does not require or imply that the system must reside separately from the requesting vehicle, but rather a request may in certain examples be generated by a first component within a vehicle (e.g., via manual user actuation) and received by a vehicle platooning control system component residing within the same vehicle. However, for illustrative purposes the discussion herein may typically refer to the control functions of the vehicle platooning control system as being directed separately with respect to the vehicles themselves.

In certain embodiments as disclosed herein the system may automatically identify a potential platoon orientation even in the absence of requests from the respective vehicles themselves. For example, the system may obtain and store data corresponding to each attempt by a vehicle to platoon, and then apply historical data for that vehicle in later trips to identify potential platoon partners. Having identified a potential platoon orientation, the system may perform a pre-condition check for each of the vehicles similar to that described above, and subsequently generate messages to each of the vehicles that notify the drivers and their respective systems of the potential platoon, and requesting acceptance to proceed with the platoon configuration.

In various embodiments, pre-conditions may only be checked after the vehicles have accepted the potential platoon offer, and indeed this may be required where for example the system can only obtain the information needed to confirm the pre-conditions after the vehicles have accepted the platooning offer.

Such pre-conditions may include vehicle status conditions, such as for example confirming the vehicles are each equipped with sufficiently properly functioning hardware and associated braking control systems, that the vehicles are appropriately positioned with respect to each other (e.g., in an appropriate lane of an appropriate roadway), that the vehicles are traveling at an appropriate speed such as between 50 and 65 miles per hour, etc. The system may for example verify that all wheel speed sensors associated with the plurality of vehicles have not been de-adjusted and other components are functioning properly.

Such pre-conditions may further include peripheral road conditions, such as for example a limited access highway, a nature or quality of the road surface, such as having relatively low grade and relatively straight, lack of construction or other impediments to normal travel, etc. The peripheral road conditions may in certain embodiments be confirmed by way of comparison of a particular location (as determined for example using GPS coordinates) with a road mapping database including relatively current details regarding road conditions.

Such pre-conditions may further include peripheral traffic conditions, such as for example the lack of other vehicles between or otherwise threatening the relative pairing of vehicles in the proposed platoon. Information may be provided by any one or more of the vehicles to the other vehicles, depending on the current positioning. For example, one or more vehicles in or near the rear in a current orientation may be best positioned through the use of radar and/or rear-facing cameras to identify non-platooning vehicles which have entered or may be about to enter the right lane of traffic in between a pair of vehicles in the potential platoon.

Other pre-conditions which may apply within the scope of the present disclosure may include without limitation ambient effects such as weather conditions (e.g., wind, temperature, air pressure). In various embodiments, the system may determine ambient conditions based not only on sensor and/or imaging data from one or more of the associated vehicles but also in view of information collected from third party data sources such as for example those associated with weather services. In certain embodiments, the system may still further collect information from other vehicles which have traversed the same roadway within a threshold period of time prior to the current platoon, and this information may be predictively applied by the system for determining the appropriateness of the platoon configuration in a given location.

In an embodiment, the system may further determine relative following distances of the one or more vehicles following the lead vehicle in the platoon, assuming the platoon conditions remain adequate (step 302). In certain embodiments, the system may be configured to determine an appropriate or nominal following distance for each of the respective following vehicles. If the actual following distance at a given time varies from the determined nominal following distance, or for example outside of an associated range, the system may be configured to further generate notifications for one or more of the relevant vehicles such that the vehicles are prompted to adjust their following distance or at least acknowledge notification regarding the same.

For example, with reference to FIG. 2A, the system may upon implementation of a platoon unit 200 according to the present disclosure may determine and further monitor a first following distance 202a between a lead vehicle 112a and a first following vehicle 112b, and a second following distance 202b between the first following vehicle 112b and a second following vehicle 112c. The system may have determined that an acceptable first following distance is (x) feet, and may prompt the driver of either or both of the lead vehicle 112a and the first following vehicle 112b to respond when the actual first following distance is greater than (x+10) feet or less than (x) feet, such as by speeding up or slowing down to adjust the first following distance.

A number of variables may be considered in determining an appropriate following distance for any particular following vehicle in the platoon, including for example estimated braking performance capabilities for each following vehicle and its respective preceding vehicle, road conditions, traffic conditions, etc. Estimated braking performance capabilities may be based at least in part on certain characteristics which may be considered over time such as brake types, sizes, tractor and trailer systems, linings, tires, ambient temperature, road conditions, etc. Other parameters such as for example a nominal traveling velocity may be determined or even dynamically adjusted (as further described below) in concert with the determination of an appropriate following distance, based on similar variables as discussed above such as for example road conditions and traffic conditions. Nominal following distances and traveling velocities may further take into account projected road conditions and traffic conditions in addition to current and identified variables, such as for example based on a specific location, time of day, day of week, mapping systems or the like for indicating upcoming road construction or accidents, etc.

In certain embodiments, actual and reliable braking test data may be acquired by an onboard system for any one or more of the vehicles or alternatively an associated server system and implemented in estimated relative braking performance capabilities for at least the vehicle(s) providing such test data. Generally speaking, reliable data may typically not be available due to the constantly changing nature of vehicle conditions (e.g., tire wear on the tractor, trailer tires, varying trailer loads). However, in some contexts it may be understood that available data is sufficiently reliable, based upon criteria including for example an amount of time and/or miles traveled since the data was collected, the current load relative to a load size at the time the data was collected, etc.

In a particular embodiment, the system may even orient the vehicles within the platoon such that vehicles having the highest estimated braking performance capabilities are progressively situated from the rear of the platoon forward, such that the vehicle having the projected highest braking performance capability is situated in the rear of the platoon and the vehicle having the projected lowest braking performance capability is situated in the front of the platoon.

Referring now to FIGS. 2B and 3, the system may proceed with step 303 of the dynamic following distance adjustment as disclosed herein by monitoring one or more target vehicles 204a directly in front of the lead vehicle 112a, and implementing relevant sensors, cameras and the like to determine characteristics 206 of the target vehicle 204a. A braking event risk may be calculated at least in part based on a relative distance, velocity and deceleration of the target vehicle 204a, further as may be exacerbated by a type of target vehicle. For example, a sedan or the like as a target vehicle may be considered as generating a relatively higher braking risk than a heavy truck, based on its relatively superior ability to suddenly brake, or otherwise stated a much smaller relative braking distance in the event of an emergency situation. However, an associated braking event risk may understandably be mitigated wherein for example the target vehicle is accelerating away from the lead vehicle, indicating a lateral movement such as for example into another lane, etc. Characteristics of the target vehicle 204a and any other relevant associated data may be fed into the server-based program engines for processing in steps 307 and/or 308.

Referring now to FIGS. 2C, 2D and 3, the system may proceed with step 304 of the dynamic following distance adjustment as disclosed herein by monitoring one or more target vehicles 204a, 204b, 204c, 204d to either side of the lead vehicle 112a and/or trailing vehicles 112b, 112c, and implementing relevant sensors, cameras and the like to determine respective characteristics 206a, 206b, 206c, 206d of the target vehicles 204a, 204b, 204c, 204d. A braking event risk may be calculated at least in part based on a relative distance, velocity and deceleration of the target vehicle 204a, further as may be exacerbated by a type of target vehicle as previously discussed. However, in this context the system further may project a likelihood of interjection by one or more of the target vehicles into the platoon orientation, wherein such predicted perturbations may substantially increase a braking event risk for any one or more affected trailing vehicles of the platoon. Characteristics of the relevant target vehicles 204a, 204b, 204c and/or 204d and associated data may accordingly be fed into the server-based program engines for processing in steps 307 and/or 308.

In one example, a target vehicle 204b may be traveling in a current direction that would indicate interjection with the platoon unit, or otherwise at least merging into the lane upon which the platoon unit is traveling. Based on the relative speeds of the target vehicle 204b and the relevant platoon vehicles, the system may calculate a likelihood that the target vehicle will merge into the lane upon which the platooning vehicles are traveling at some position 208 ahead of the lead vehicle, behind the rear vehicle, or otherwise interjected between a pair of vehicles in the platoon. As further described below, the system may further determine that even if such a maneuver were to be executed it would encompass little to no braking risk for any one or more vehicles in front of a projected interjection, but nonetheless it would encompass at least a moderate if not significant braking risk for any one or more trailing vehicles.

In another example, one lead target vehicle 204a may be positioned in front and to the side of the lead vehicle 112a, while another target vehicle 204c is positioned directly behind the lead target vehicle 204a. Based on the relative speeds of the target vehicles 204a, 204c, and a longitudinal distance between the lead platoon vehicle 112a and the lead target vehicle 204a, the system may calculate a likelihood that either or both of the target vehicles will laterally cut into the lane upon which the platooning vehicles are traveling at position 208a. As further described below, the system may further determine that even if such a maneuver were to be executed it would encompass little braking risk for the lead vehicle, but nonetheless it would encompass at least a slightly greater if not moderate braking risk for one or more trailing vehicles.

In another example, a target vehicle 204d is positioned directly behind target vehicle 204c. Based on the relative speeds of the target vehicles 204a, 204c, 204d, and a longitudinal distance between the lead platoon vehicle 112a and the lead target vehicle 204a, the system may calculate a likelihood that either or both of the target vehicles 204c, 204d, will laterally cut into the lane upon which the platooning vehicles are traveling at either or both of positions 208b, 208c. As further described below, the system may further determine that even if such a maneuver were to be executed it would encompass little to no braking risk for any one or more vehicles in front of a projected interjection, but nonetheless it would encompass at least a moderate if not significant braking risk for any one or more trailing vehicles.

Referring next to FIG. 2e, in another example the system may determine effects (step 305) based on a target vehicle 204e positioned directly behind rear platoon vehicle 112c. Based on the relative velocity/acceleration of the target vehicle 204e, and a longitudinal distance between the rear platoon vehicle 112c and the target vehicle 204e, the system may calculate a likelihood that the target vehicle 204e will closely track or "tailgate" the platoon. For example, it may be understood that certain vehicles may anticipate or otherwise desire to join an existing platoon, but may be denied access to the platoon because of deficiencies in the necessary sensors or other components. Such vehicles may in certain embodiments or contexts be expected to closely track or potentially perturb the platoon orientation for at least a period of time. As further described below, the system may further determine that in such an event the various platoon vehicles may for example need to extend their respective following distances in order to reduce any braking risk otherwise attributable to additional projected interjections as described above.

In an embodiment, the system may further monitor traffic and ambient conditions as they would potentially affect braking performance capabilities over time for one or more of the vehicles in the platoon (step 306). This may for example involve braking data as may be gathered during normal operation and with respect to expected values or variables relative to the braking data, such as for example expected deceleration with respect to pressure applied during a braking operation, or monitoring of ABS events which may take place, during an interim period after initiation of a platoon as disclosed herein. If the system is able to determine that target vehicle conditions and characteristics, braking performance capabilities, road conditions, ambient conditions, etc., have changed such that the platoon orientation should not be maintained, the system may in various embodiments be configured to cancel the platoon orientation or other generate notifications to that effect (step 307). As but one possible alternative, rather than cancelling the platooning operation the system may merely suspend the platooning operation or otherwise dynamically modify the platooning operation such that the following distances for the respective vehicles are temporarily adjusted in compensation for transient non-optimal conditions (step 308).

The dynamic adjustments to the following distances may take various exemplary forms, dependent for example on a relative position of a particular vehicle in the platoon, a relative braking event risk, a magnitude of the likely braking risk, etc.

In one particular embodiment, an adjusted following distance $D_{new}$ may be determined according to the exemplary equation:

$$D_{new} = D_{nom} + (D_{emer} - D_{nom})(\alpha * \beta * \tau * \gamma)$$

where $D_{nom}$ is the nominal following distance determined for the associated platoon vehicle pairing; $D_{emer}$ is a maximum following distance as may be required in certain circumstances while still operating under a platoon configuration; $\alpha$ represents a likelihood of a braking event as determined in accordance with the various target vehicle inputs described above; $\beta$ represents a magnitude of the braking event, wherein for example a 1.0 braking event would represent an emergency braking event; $\tau$ represents a positional amplifier wherein a following distance adjustment is amplified for vehicles being farther back in the platoon chain; and $\gamma$ represents a dampening effect applied via for example a threshold comparison in order to prevent premature reactions to relatively inconsequential braking events.

In a particular example according to the previous embodiment, the system may determine that a combination of target vehicle characteristics should be calculated as providing a 5% (i.e., $\alpha=0.05$) braking event likelihood for the rear platoon vehicle 112c in the example cited above. Assuming in this example that all braking events being considered are emergency braking events (i.e., B=1.0), and that an appropriate multiplier $\tau$ would be 3.0 for the third vehicle in the affected chain, that the nominal following distance was 50 feet, and that the maximum following distance was 80 feet, this would result in an equation of:

$$D_{new} = 50 + (80-50)(0.05 * 1.0 * 3.0 * \gamma),$$

or $$D_{new} = 50 + 4.5\gamma.$$

Further assuming in this exemplary embodiment that the variable $\gamma$ is determined by whether or not a threshold braking event risk is exceeded, and ranges in binary fashion between 0 and 1, the following distance for the rear platoon vehicle would either remain at the nominal value of 50 feet or be adjusted to a following distance of 54.5 feet. The threshold in question may in various embodiments be a fixed and predetermined value, or otherwise may be variable in nature and determined based upon any inherent risks associated with the platoon conditions.

It may be understood that the aforementioned example is not intended as limiting on the scope of the present invention, but merely as illustrative of a relatively simple example of the calculations which may be involved in dynamically adjusting following distances in a manner which is (1) reliant upon determined values exceeding a threshold which operates to dampen short-term and potentially unreliable compensations; and further (2) provides a degree of adjustment to the determined nominal following distances that is inversely correlated with respect to a relative proximity of the particular following vehicle to a predicted external perturbation. For example, a rear vehicle 112c may be expected to adjust its following distance at a greater degree than the adjustment for an immediately preceding vehicle in the platoon, based on a predicted perturbation to the platoon at a point in front of both vehicles.

In an embodiment, the system may additionally or in the alternative determine a nominal traveling velocity for vehicles in the platoon, and dynamically adjust the nominal traveling velocities in response to external perturbations or the like as otherwise described herein. For example, in certain conditions the system may determine that a braking event risk is generally reduced by reducing the collective traveling velocity of each vehicle in the platoon, even where the following distances themselves remain the same. In another condition, such as for example where one or more target vehicles are aggressively approaching the platoon from behind and/or from the side, one or more vehicles in the platoon may respond by increasing their traveling velocity to prevent or mitigate the likelihood of a braking event or crash, or in some cases to facilitate a temporary merge by a target vehicle in between platooning vehicles.

Upon dynamically adjusting the nominal following distances for one or more of the vehicles in the platoon, the control system may further provide signals to the respective vehicle systems or otherwise direct associated vehicle components to be regulated in a manner known to those of skill in the art, wherein vehicle speeds are adjusted based on the new following distance (step 309).

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A control system for a platoon orientation comprising a lead vehicle and one or more following vehicles,
   each of the vehicles in said platoon orientation respectively equipped with one or more vehicle braking control systems and vehicle-to-vehicle communication system components,
   wherein the control system comprises a processor configured to execute a computer program product and thereby direct the performance of operations comprising:
      determining a nominal following distance for each of said following vehicles with respect to an immediately preceding vehicle in the platoon, using at least data corresponding to brake performance capabilities for each of said vehicles;
      continuously monitoring, via sensors associated with at least the lead vehicle, parameters associated with one or more target vehicles positioned relative to the platoon;
      dynamically adjusting one or more of said determined nominal following distances based on a threshold violation with respect to the monitored parameters; and
      simultaneously generating control signals implementing vehicle movement adjustments based on the following distance adjustments.

2. The control system of claim 1, wherein the continuously monitored parameters comprise relative distance, velocity and acceleration/deceleration for each of one or more target vehicles positioned directly in front of the lead vehicle.

3. The control system of claim 2, wherein the continuously monitored parameters further comprise relative distance, velocity and acceleration/deceleration of one or more target vehicles potentially merging into the lane of the lead vehicle and directly in front of the lead vehicle.

4. The control system of claim 3, further comprising continuously monitoring, via sensors associated with each of the following vehicles, parameters associated with one or more target vehicles positioned relative to the platoon.

5. The control system of claim 4, wherein the continuously monitored parameters comprise relative distance, velocity and acceleration/deceleration for each of one or more target vehicles positioned directly behind a trailing vehicle in the platoon or potentially merging into the lane of the platoon and in between a respective pair of vehicles in the platoon.

6. The control system of claim 1, wherein the continuously monitored parameters further comprise potential non-vehicular obstructions or disturbances relative to the lead vehicle.

7. The control system of claim 1, wherein said control signals are generated prior to an actual reaction by the lead vehicle based on the predicted external disturbance.

8. The control system of claim 1, wherein a degree of adjustment to the one or more of said determined nominal following distances is inversely correlated with respect to a relative proximity of a respective following vehicle to a predicted external disturbance.

9. The control system of claim 1, wherein each of the vehicles are equipped with one or more sensors collectively configured to monitor at least
   a following distance between said vehicle and the other one or more vehicles,
   a relative deceleration value for said vehicle, and
   a pressure value with respect to a braking actuator for said vehicle,
   further wherein the nominal following distance is determined based at least in part on a respective expected deceleration value per unit pressure applied to the braking actuator for each vehicle.

10. The control system of claim 9, wherein the nominal following distance for each of said following vehicles with respect to an immediately preceding vehicle in the platoon is determined based on vehicle speed, load, road conditions and ambient conditions.

11. The control system of claim 1, further comprising:
    monitoring an actual following distance between respective vehicles in the platoon orientation, and
    directing an adjustment of the actual following distance between any respective vehicles in the platoon orientation upon the actual following distance violating a threshold range determined in accordance with the nominal following distance.

12. A control system for a platoon orientation comprising a lead vehicle and one or more following vehicles, each of the vehicles in said platoon orientation respectively equipped with one or more vehicle braking control systems and vehicle-to-vehicle communication system components,
wherein the control system comprises a processor configured to execute a computer program product and thereby direct the performance of operations comprising:
determining a nominal following distance for each of said following vehicles with respect to an immediately preceding vehicle in the platoon;
determining a braking event risk for each of said following vehicles based on sensed activity of one or more target vehicles relative to the platoon, and independently of a braking event risk for said lead vehicle;
dynamically adjusting one or more of said determined nominal following distances based on the braking event risk for respective following vehicles; and
simultaneously generating control signals implementing vehicle movement adjustments based on the following distance adjustments.

13. The control system of claim 12, wherein the processor is further configured to direct the performance of obtaining and processing data corresponding to relative braking performance capabilities for each of said vehicles.

14. The control system of claim 13, wherein the operation of determining a braking event risk for each of said following vehicles comprises
continuously monitoring, via sensors associated with each of the vehicles in the platoon, activity with respect to one or more target vehicles positioned relative to the platoon.

15. The control system of claim 14, wherein the continuously monitored activity comprises one or more of relative velocity, lateral movement, braking activity and deceleration for each of one or more target vehicles positioned directly in front of the lead vehicle, directly behind a trailing vehicle, or potentially merging in between a respective pair of vehicles in the platoon.

16. The control system of claim 12, wherein said control signals are generated independently of any detected reaction by the lead vehicle.

17. The control system of claim 16, wherein a degree of adjustment to the one or more of said determined nominal following distances is inversely correlated with respect to a relative proximity of a respective following vehicle to a determined source of braking event risk.

18. The control system of claim 12, wherein each of the vehicles are equipped with one or more sensors collectively configured to monitor at least
a following distance between said vehicle and the other one or more vehicles,
a relative deceleration value for said vehicle, and
a pressure value with respect to a braking actuator for said vehicle,
further wherein respective braking performance capabilities for each vehicle are determined in part based on an expected deceleration value per unit pressure applied to the braking actuator.

19. The control system of claim 12, wherein the processor is further configured to direct the performance of:
monitoring an actual following distance between respective vehicles in the platoon orientation, and
directing an adjustment of the actual following distance between any respective vehicles in the platoon orientation upon the actual following distance violating a threshold range determined in accordance with the nominal following distance.

20. A control system for a platoon orientation comprising at least a lead vehicle and a rear vehicle,
each of the vehicles in said platoon orientation respectively equipped with one or more vehicle braking control systems and vehicle-to-vehicle communication system components,
wherein the control system comprises a processor configured to execute a computer program product and thereby direct the performance of operations comprising:
determining a nominal traveling velocity for each vehicle, and a nominal following distance for each vehicle with respect to an immediately preceding vehicle in the platoon, using at least data corresponding to brake performance capabilities for each of said vehicles;
continuously monitoring, via sensors associated with at least the rear vehicle, parameters associated with one or more target vehicles positioned relative to the platoon;
dynamically adjusting a nominal traveling velocity for one or more of the vehicles in the platoon based on the determined nominal following distances and on a threshold violation with respect to the monitored parameters; and
simultaneously generating control signals implementing vehicle movement adjustments based on the corresponding traveling velocity adjustments.

\* \* \* \* \*